United States Patent

[11] 3,542,237

| [72] | Inventor | De Forest D. Butler |
| | | Lexington, Kentucky |
| [21] | Appl. No. | 741,385 |
| [22] | Filed | July 1, 1968 |
| [45] | Patented | Nov. 24, 1970 |
| [73] | Assignee | Square D Company |
| | | Park Ridge, Illinois |
| | | a corporation of Michigan |

[54] ELECTRICAL FLOOR OUTLET HOUSING
4 Claims, 6 Drawing Figs.

[52] U.S. Cl. ..................................................... 220/3.94, 220/4
[51] Int. Cl. ..................................................... H02g 3/08
[50] Field of Search ........................................... 220/3.92, 3.94, 4A, 4E, 18

[56] References Cited

UNITED STATES PATENTS

| 457,761 | 8/1891 | Dillon ........................... | 220/3.92X |
| 1,064,402 | 6/1913 | Vibber .......................... | 220/3.94X |

FOREIGN PATENTS

| 664,051 | 5/1963 | Canada ......................... | 220/3.94 |
| 1,253,068 | 12/1960 | France .......................... | 220/4(E) |

*Primary Examiner*—George E. Lowrance
*Attorneys*—Harold J. Rathbun and Paul J. Rose

ABSTRACT: Two identical generally quadrispherical shells, each having a flange portions, interfit with each other and with a base plate to provide an easily assembled hemispherical housing for an electrical floor outlet.

Patented Nov. 24, 1970
3,542,237
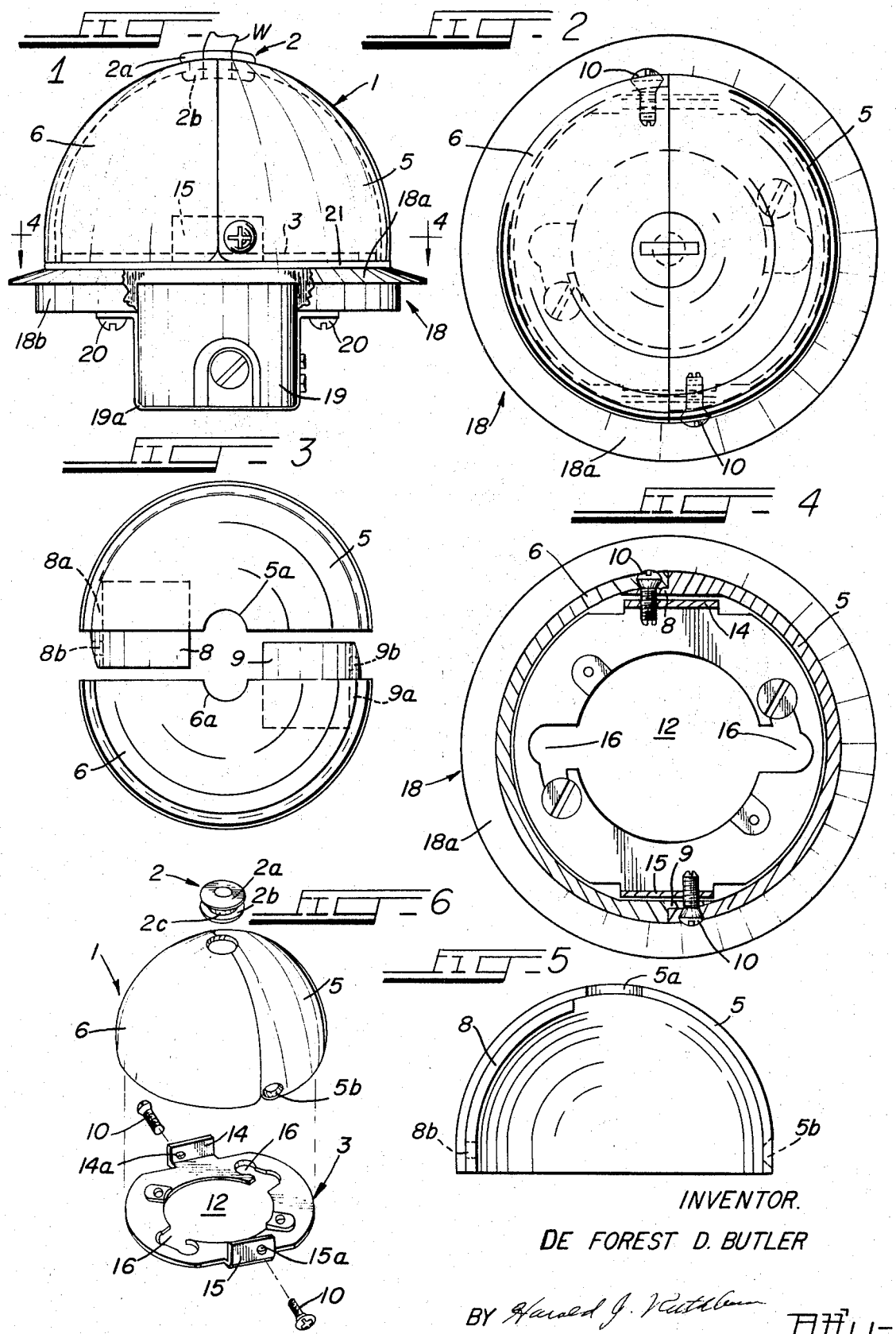
INVENTOR.
DE FOREST D. BUTLER 3,542,237

ELECTRICAL FLOOR OUTLET HOUSING

This invention relates to an improved housing for an electrical floor outlet, and more particularly to a hemispherical housing which may be readily assembled from interfitting parts over an electrical floor outlet positioned near the floor level in or above an access opening of or leading to an underfloor wiring duct.

Electrical outlets positioned above the floor level and providing access to wiring in underfloor distribution ducts are easily damaged. Commonly, the housing for such outlets provides openings through which face portions of electric receptacles are exposed for reception of conventional plug-in connectors. The resulting electrical connection is highly susceptible to interruption when exposed to abusive usage. However, for electrical connections intended to be of a relatively temporary duration, the exposed receptacle and plug connection is essential.

For more permanent electrical connections, however, it is a desirable and acceptable practice to maintain and protect the continuity of such electrical connections by mounting the receptacle beneath a service fitting having its upper surface flush with the floor surface. Such flush floor service fittings adequately afford protection for the receptacle, but the plug-in connector is exposed and unprotected and the extending wire is also inadequately protected in a critical "wear and tear" area immediately adjacent the service fitting. Therefore, in the absence of a design requirement dictating the specific usage of a completely flush floor outlet and in the presence of rough handling or usage conditions tending to enhance the probability of a circuit interruption, the most satisfactory and advantageous outlet configuration is one which, when assembled, extends above the surface level of the floor, confines the plug-in connector within a sturdy housing, and provides limited access to the connector. Use of this type of outlet has been somewhat limited due to the problems of providing a suitable housing which is capable of being easily installed after the completion of the electrical connection, economical to manufacture, sturdy in its construction, and simple to handle and assemble while accommodating the electrical outlet wire, and wherein the electric connector is readily accessible for maintenance and change.

An object of the present invention is to provide an improved electrical outlet housing which extends above the surface of the floor for protectively enclosing a plug-in connector.

Another object is to provide an improved floor-mounted outlet housing comprising parts that are economical to manufacture and easy to assemble to form the housing.

Another object is to provide an improved floor-mounted housing for an electric outlet receptacle wherein the receptacle is readily accessible during installation and maintenance, and the housing assembly, after the electrical installation is complete, forms a generally hemispherical shell about a plug-in connector at the end of a wire entering an upper portion of the housing.

An outlet housing according to the invention comprises a base portion, a top portion, and a collar portion. The top portion comprises two identical quadrispherical shells which may be interfitted together and with the base portion at the job site after completion of the electrical connections to a receptacle mounted at or near the floor level. The base portion has a central opening to permit access to an electrical receptacle connected to wiring in an underfloor distribution duct and is suitably attached to the duct by means of a floor plate assembly. The quadrispherical walls of the top portion are provided with metal flanges which, when the two walls are interfitted, extend inwardly of an adjacent wall to provide a seal and to facilitate the interconnection of the sections. The base portion is provided with upwardly turned flanges to form mounting means for mounting the top portion upon the base portion. The upper extremity of the top portion is provided with an opening which accommodates a generally cylindrical collar portion or grommet surrounding the entering electrical wire and serving to reduce movement of the wire with respect to the plug-in connector.

Other objects and advantages of the invention will become apparent from the following description wherein reference is made to the drawings, in which:

FIG. 1 is a side view of a housing in accordance with this invention mounted over a floor outlet comprising a floor plate assembly including an electric receptacle, a portion of the floor plate assembly being cut away;

FIG. 2 is a top view of the housing and outlet illustrated in FIG. 1;

FIG. 3 is an exploded top view of the housing of FIG. 1 illustrating the interfitting of two quadrispherical shells comprising the top portion;

FIG. 4 is a sectional view of the housing taken as indicated at 4—4 in FIG. 1;

FIG. 5 is a side view of one of the shells; and

FIG. 6 is a perspective exploded view of the housing of FIG. 1.

Referring to the drawings, an outlet housing in accordance with this invention comprises a two-piece top portion 1, a collar portion 2 which surrounds an electrical wire W leading from the outlet housing and a base portion 3.

The top portion 1 is a generally hemispherical shell comprising two identical interfitting quadrispherical shell portions 5 and 6, which preferably are metal die-castings. The shell portion 5 has a bottom edge and a side edge and has an integrally formed flange portion 8 extending outwardly partway along the side edge. A thickened portion 8a is formed on the inner surface of the shell portion 5 adjacent the side edge from which the flange portion 8 extends and constitutes a base for the flange portion 8, the exposed surface of the portion 8a being aligned with the inner surface of the flange 8. The flange portion 8 has a spherical outer surface conforming to the curvature of the inner surface of the shell portion 5 and preferably extends along the side edge thereof from the bottom edge of the shell portion 5 to near the middle of the side edge, i.e., near the apex of the top portion 1. The flange portion 8 also has an aperture 8b extending therethrough near its bottom edge. At precisely the middle of the side edge of the shell portion 5, i.e., at the apex of the top portion 1, is formed a generally semicircular recess 5a. Located near the side edge of the shell portion 5 at the opposite end thereof from the lower edge of the flange portion 8 is an aperture 5b extending through the wall of the shell portion 5.

A detailed description of the shell portion 6 is not given above since it is identical to the shell portion 5, the shell portion 6 having an integrally formed flange portion 9, like the flange 8, and a thickened portion 9a, an aperture 9b, a semicircular recess 6a, and an aperture 6b, like portion 8a, aperture 8b, recess 5a, and aperture 5b.

In assembling the shells 5 and 6 to form the top portion 1, the shell 5 is oriented 180° in angular rotation with respect to the shell 6 as shown in FIG. 3. When the shells 5 and 6 are assembled together, the flange portion 8 of the shell 5 extend along the inner surface of the shell 6 adjacent the side edge thereof and the flange portion 9 of the shell portion 6 extends along the inner surface of the shell 5 adjacent the side edge thereof. The aperture 8b of the flange portion 8 underlies and aligns with the aperture 6b of the shell 6 and the aperture 9b of the flange portion 9 underlies and aligns with the aperture 5b of the shell 5, each pair of alined apertures 8b and 6b and 9b and 5b receiving respective screws 10 which serve as an interconnecting means for the shells 5 and 6 as will be described.

The collar portion 2 is a generally tubular structure of electrical insulating material and comprising cylindrical upper and lower portion 2a and 2b on opposite sides of a cylindrical middle portion 2c of reduced diameter. The reduced middle portion 2c has an outer radius equal to the radius of the semicircular recesses 5a and 6a of the shells 5 and 6. When assembled with the top portion 1, the upper and lower portions 2a and 2b of the collar portion 2 extend over and under, respectively, the marginal edges circumferentially surrounding the reduced middle portion 2c to restrict the movement of the collar portion 2 with respect to the top portion 1 of the outlet housing.

It is to be understood that the collar portion 2 must be inserted over the electrical wire W prior to the installation of the top portion 1 of the floor outlet housing. The assembly of the top portion 1 can be accomplished in the above-described manner, care being taken that during the assembly of the top portion 1 that the cylindrical collar 2 is properly engaged within the recesses 5a and 6a.

The base portion 3, as best shown in FIG. 6, is a generally rectangular flat plate with two of its opposite sides linear and the other two arcuate, and is provided with a central opening 12. A pair of upwardly extending generally rectangular flanges 14 and 15 extend along the opposite linear sides of the base portion 3. The flanges 14 and 15 have apertures 14a and 15a contained respectively in opposite end portions of the flanges as divided by a plane normal to and bisecting both the flanges. In assembling the top portion 1 and the base portion 3, the shells 5 and 6 are interfitted over the base portion 3 so that the flanges 14 and 15 of the base portion 3 protrude upwardly into the top portion 1 to provide mounting means for assembling the floor outlet with the apertures 14a and 15a aligned to receive, by threaded connections, the respective screws 10.

Referring now specifically to the assembly shown in FIG. 1, the base portion 3 is secured in a conventional manner, as illustrated by slots 16 in FIGS. 4 and 6, to a floor plate 18 of an electrical outlet. The floor plate 18 has a generally circular flange portion 18a and a tubular bottom portion 18b. The bottom portion 18b is received within an opening in the floor defining the upper portion of an access passageway (not shown) leading from the interior confines of an underfloor duct. The flange portion 18a forms a thin mushroomlike cap extending over the marginal edges of the floor about the opening. The floor plate 18 carries an electric receptacle 19, which receptacle may be attached to the floor plate assembly 18 by means of a metal band 19a and attaching screws 20 threaded into apertures (not shown) of the floor plate 18. The adjustment which determines the depth to which the receptacle 19 is received within the recess passageway, as well as the adjustment which facilitates the accommodation of receptacles of various sizes, may be provided by selecting the length of the screws 20 or the depth of the metal band 19a as is readily apparent.

I claim:

1. A housing for an electrical floor outlet comprising a hemispherical enclosure formed of a pair of identical quadrispherical shells, each shell having a radially inwardly offset flange extending outwardly generally perpendicularly from one end portion of a side edge face thereof and inside the other shell at an opposite side edge portion thereof from its flanged end, and a generally flat base plate having a pair of flanges extending upwardly respectively from opposite side edges and having an opening between the flanges, each flange of the base plate being received in the hemispherical enclosure on the inner side of a flange of a respective one of the shells, each shell having a first aperture in its flange and a second aperture adjacent an opposite side edge portion from its flanged end, the first and second apertures of each shell being on opposite sides of a reference plane containing the side edges of the shells, and each flange of the base plate having an aperture on the opposite side of the reference plane from the aperture in the other flange of the base plate and alined with the first aperture of one shell and the second aperture of the other shell.

2. A housing as claimed in claim 1 wherein the outer surface of the flange of each shell is a spherical surface of a radius substantially equal to the radius of the inner surface of the shell.

3. A housing as claimed in claim 1 wherein the flange of each shell extends arcuately along the side edge thereof from a point adjacent the bottom edge thereof to a point adjacent the center of the side edge.

4. A housing as claimed in claim 3 wherein the outer surface of the flange of each shell is a spherical surface of a radius substantially equal to the radius of the inner surface of the shell.